United States Patent
Zhang

(10) Patent No.: US 12,059,932 B2
(45) Date of Patent: Aug. 13, 2024

(54) LEFT AND RIGHT WHEEL DETERMINATION METHOD, CHIP AND SYSTEM FOR MONITORING WHEEL PRESSURE

(71) Applicant: Autochips Wuhan Co., Ltd., Wuhan (CN)

(72) Inventor: Tao Zhang, Wuhan (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 532 days.

(21) Appl. No.: 17/347,586

(22) Filed: Jun. 15, 2021

(65) Prior Publication Data

US 2021/0387487 A1 Dec. 16, 2021

(30) Foreign Application Priority Data

Jun. 16, 2020 (CN) .......................... 202010549091.X

(51) Int. Cl.
*B60C 23/00* (2006.01)
*B60C 23/04* (2006.01)
(Continued)

(52) U.S. Cl.
CPC ...... *B60C 23/0416* (2013.01); *B60C 23/0488* (2013.01); *B60K 35/00* (2013.01);
(Continued)

(58) Field of Classification Search
None
See application file for complete search history.

(56) References Cited

U.S. PATENT DOCUMENTS 10,737,541 B1 * 8/2020 Engl .................. B60C 23/0416
2003/0197603 A1 * 10/2003 Stewart .............. B60C 23/0444
340/686.1
(Continued)

FOREIGN PATENT DOCUMENTS

CN   102069686 A   5/2011
CN   103770583 A   5/2014
(Continued)

OTHER PUBLICATIONS

European search report, European Application No. 21179595.0, mailed Sep. 21, 2021 (6 pages).
(Continued)

*Primary Examiner* — James M McPherson

(57) ABSTRACT

The present disclosure provides a left and right wheel determination method, a wheel pressure monitoring chip and system, and related apparatuses. The left and right wheel determination method includes: obtaining a time duration for a wheel to rotate for a predetermined number of revolutions after the wheel being detected as rotating; sampling centrifugal acceleration and tangential acceleration of the wheel within the time duration; determining an overrun-lag relationship between the centrifugal acceleration and the tangential acceleration of the wheel based on a serial number of a sampling time-point corresponding to the centrifugal acceleration and a serial number of a sampling time-point corresponding to the tangential acceleration; and determining the wheel to be of a left wheel or a right wheel based on the overrun-lag relationship between the centrifugal acceleration and the tangential acceleration of the wheel.

12 Claims, 11 Drawing Sheets

(51) Int. Cl.
  *B60K 35/00* (2006.01)
  *B60K 35/28* (2024.01)
(52) U.S. Cl.
  CPC ........ *B60K 35/28* (2024.01); *B60K 2360/168* (2024.01); *B60K 2360/171* (2024.01)

(56) References Cited

U.S. PATENT DOCUMENTS

| | | | |
|---|---|---|---|
| 2005/0179530 A1* | 8/2005 | Stewart | B60C 23/0488 340/447 |
| 2006/0017554 A1* | 1/2006 | Stewart | B60C 23/0444 340/447 |
| 2006/0238323 A1* | 10/2006 | Watabe | B60C 23/0416 340/447 |
| 2009/0012740 A1 | 1/2009 | Hain et al. | |
| 2012/0116607 A1 | 5/2012 | Guinart | |
| 2012/0319831 A1* | 12/2012 | Maehara | B60C 23/0416 340/447 |
| 2018/0244116 A1* | 8/2018 | Zhuk | B60C 23/0416 |
| 2021/0319831 A1 | 10/2021 | Gorobets et al. | |
| 2023/0065157 A1* | 3/2023 | Löffler | B60C 23/0462 |

FOREIGN PATENT DOCUMENTS

| | | |
|---|---|---|
| CN | 106457936 A | 2/2017 |
| CN | 107471928 A | 12/2017 |
| CN | 109760477 A | 5/2019 |
| CN | 109849595 A | 6/2019 |
| EP | 3315329 A1 | 5/2018 |
| JP | 6477966 B1 | 3/2019 |
| TW | 530013 B | 5/2003 |
| TW | 201623038 A | 7/2016 |

OTHER PUBLICATIONS

Chinese Rejection decision, Application No. 202010549091.X, mailed Aug. 1, 2023(13 pages).
Notice of examination opinion of Taiwan, China, Application No. 110121850, mailed Dec. 29, 2021 (21 pages).
Chinese First office action, Chinese Application No. 202010549091.X, mailed Dec. 28, 2022 (13 pages).

* cited by examiner

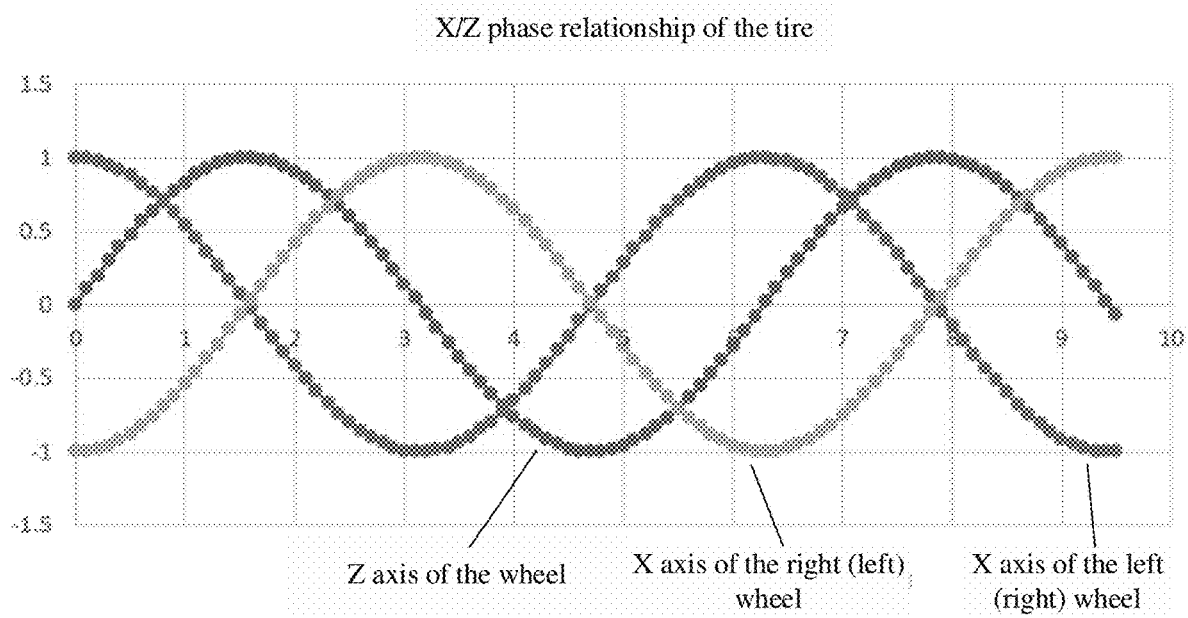

FIG. 5

S131 a serial number of a first sampling point corresponding to the maximum centrifugal acceleration within the time duration, a serial number of a second sampling point corresponding to the minimum centrifugal acceleration within the time duration, a serial number of a third sampling point corresponding to the maximum tangential acceleration within the time duration, and a serial number of a fourth sampling point corresponding to the minimum tangential acceleration within the time duration may be obtained

S132 the overrun-lag relationship between the centrifugal acceleration and the tangential acceleration of the tire may be determined based on the serial number of the first sampling point, the serial number of the second sampling point, the serial number of the third sampling point, and the serial number of the fourth sampling point

FIG. 6

S1321 the serial number of the first sampling point and the serial number of the second sampling point may be compared, and a state of the centrifugal acceleration of the tire within the time duration may be determined as an increasing state or a decreasing state. The serial number of the third sampling point and the serial number of the fourth sampling point may be compared, and a state of the tangential acceleration of the tire within the time duration may be determined as an increasing state or a decreasing state.

S1322 the overrun-lag relationship between the centrifugal acceleration of the tire and the tangential acceleration of the tire may be determined based on the state of the centrifugal acceleration of the tire and the state of the tangential acceleration of the tire

FIG. 7

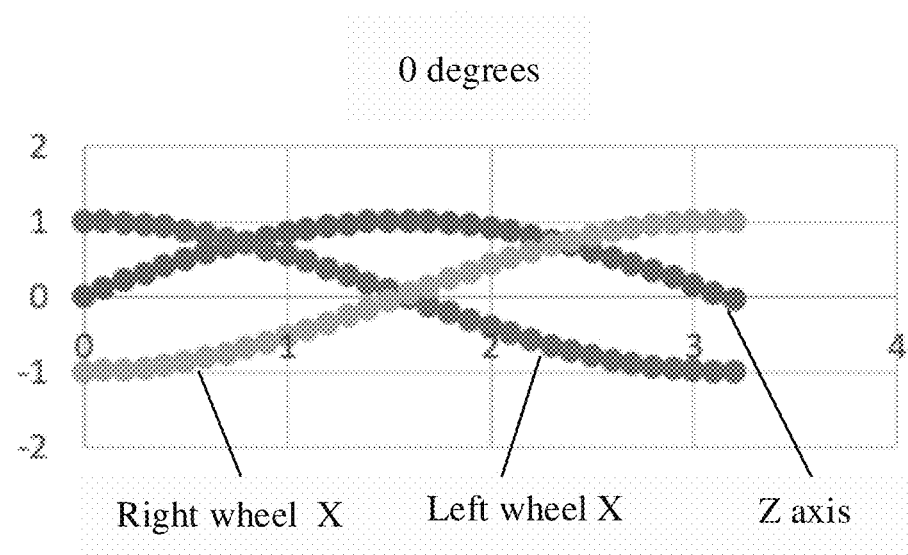

FIG. 8a

LEFT AND RIGHT WHEEL DETERMINATION METHOD, CHIP AND SYSTEM FOR MONITORING WHEEL PRESSURE

CROSS-REFERENCE TO RELATED APPLICATIONS

The present application claims foreign priority of Chinese Patent Application No. 202010549091.X, filed on Jun. 16, 2020, in the National Intellectual Property Administration of China, and the entire content of which is hereby incorporated by reference in its entirety.

TECHNICAL FIELD

The present disclosure relates to the field of vehicle electronics, and in particular to a left and right wheel determination method, a chip and a system for monitoring wheel pressure.

BACKGROUND

According to statistics, traffic accidents on domestic highways caused by wheels account for 70% of total traffic accidents, and traffic accidents caused by flat wheels account for more than 42% of total traffic accidents. In the United States, a ratio of these traffic accidents to the total traffic accidents is even higher. The U.S. Code of Federal Regulations require any car released after November 2003 to have a wheel pressure monitoring system as a standard configuration. In recent years, the Chinese government has paid great attention to the traffic accidents caused by wheels. In 2020, mandatory configuration regulations are applied in China that any production passenger car is required to be configured with a direct or an indirect tire pressure monitoring system (hereinafter referred to as TPMS).

For the TPMS product in the market, the technology is relatively backwards. For various TPMS products, sensors configured on bodies of cars may apply various methods for positioning. The various positioning methods may determine overall design ideas and framework of the product, which may involve a structural appearance of the vehicle, an electronic design of the vehicle, chip set composition of the vehicle, a configuration process and cost of the vehicle, and so on. The positioning methods via sensors in the domestic products may be classified into three categories. For a first category, a sensor may be physically fixed. The sensor may be disposed at a fixed position of the wheel. Before being released into the market, each sensor has been fixedly disposed on a left front wheel, a right front wheel, a left rear wheel, a right rear wheel. A receiving antenna may be configured to work cooperatively with the sensor. A disadvantage of such configuration may be the four sensors in one product being distinct from each other clearly and each sensor being disposed at the only fixed position. A production difficulty may be increased, time consumed for configuration may be increased, and costs for maintenance at a later stage may be increased. For a second category, low-frequency communication may be performed for positioning. A component for the low-frequency communication may be configured, and therefore, it may be inevitable to configure a low-frequency receiving antenna. In the art, only four low-frequency receiving antennas and two low-frequency receiving antennas are available. As more strict requirements are applied for the low-frequency receiving antenna, for the positioning method in the second category, the configuration difficulty may be increased significantly, and costs for production may be increased. For a third category, positioning may be achieved through a learner, which may read codes and write codes. All sensor identifiers may be learned in sequence through a handheld learner. The sensor identifiers may be written in sequence to a receiving end. In this way, positioning may be achieved. However, the positioning method in the third category may require the learner to be additionally configured and require manual operations to learn and write. When the learned content is lost, the learning process may be performed again, increasing costs of the product and maintenance.

SUMMARY OF THE DISCLOSURE

The present disclosure provides a left and right wheel determination method, a wheel pressure monitoring chip, an apparatus and a system, and a storage apparatus, which may facilitate wheel determination by acceleration sensors having relatively low accuracy.

According to a first aspect of the present disclosure, a wheel determination method includes: obtaining a time duration for a wheel to rotate for the predetermined number of revolutions after the wheel being detected as rotating; sampling centrifugal acceleration and tangential acceleration of the wheel within the time duration; determining an overrun-lag relationship between the centrifugal acceleration and the tangential acceleration of the wheel based on serial numbers of sampling time-points corresponding to the centrifugal acceleration and serial numbers of sampling time-points corresponding to the tangential acceleration; and determining the wheel to be a left wheel or a right wheel based on the overrun-lag relationship between the centrifugal acceleration and the tangential acceleration of the wheel.

According to a second aspect of the present disclosure, a wheel pressure monitoring chip is provided and includes: a pressure sensor, configured to detect and obtain pressure data of a wheel; an acceleration sensor, configured to detect and obtain the centrifugal acceleration and the tangential acceleration of the wheel; a controller, coupled to the pressure sensor and acceleration sensor respectively, and configured to determine the wheel to be a left wheel or a right wheel based on the centrifugal acceleration and the tangential acceleration of the wheel detected by the acceleration sensor, wherein the controller is configured to position the wheel by performing the method described in the first aspect; and an RF transmitter, coupled to the controller for sending a determination result of the wheel and the pressure data of the wheel to a vehicle processor.

According to a third aspect of the present disclosure, a wheel pressure monitoring system is provided and includes: a wheel pressure monitoring apparatus, a vehicle processor, a display, and a wheel pressure signal receiving apparatus. The wheel pressure monitoring apparatus, the vehicle processor, the display, and the wheel pressure signal receiving apparatus are inter-coupled with each other. The wheel pressure monitoring apparatus is configured on wheels of the vehicle for detecting pressure data of wheels of the vehicle, positioning the wheels, and sending positioning results of the wheels and the pressure data of the wheels to the wheel pressure signal receiving apparatus. The vehicle processor is configured to control the display to display the positioning results and pressure data of each of the wheels based on the positioning results and the pressure data received by the wheel pressure signal receiving apparatus. The wheel pressure monitoring apparatus includes a battery and the wheel pressure monitoring chip as described in the second aspect.

According to the present disclosure, after wheel rotation is detected, a time duration for the wheel to rotate for the predetermined number of revolutions may be obtained. A centrifugal acceleration and a tangential acceleration of the wheel within the time duration may be sampled. An overrun-lag relationship between the centrifugal acceleration and the tangential acceleration of the wheel may be determined based on serial numbers of sampling time-points corresponding to the sampled centrifugal acceleration and the sampled tangential acceleration, respectively. The wheel may be determined to be a left wheel or a right wheel based on the overrun-lag relationship between the centrifugal acceleration and the tangential acceleration of the wheel. According to the present disclosure, the wheel may be determined to be the left wheel or the right wheel based on the overrun-lag relationship between the centrifugal acceleration and tangential acceleration of the wheel. A value of the acceleration may not be analyzed. Requirements for accuracy of an acceleration sensor may be low. In addition, time for sampling the acceleration may be time for the wheel to rotate for half a revolution to one-full revolution. Power consumption for the product is low. Only the maximum centrifugal acceleration, the minimum centrifugal acceleration, the maximum tangential acceleration and the minimum tangential acceleration are stored. A storage space of the product may not be large. The overrun-lag relationship between the centrifugal acceleration and tangential acceleration of the wheel may be determined by comparing the serial number of the sampling time-point corresponding to the maximum acceleration and the serial number of the sampling time-point corresponding to the minimum acceleration. Therefore, an acceleration sensor having relatively low accuracy may be configured for achieving wheel positioning, and the accuracy of the acceleration sensor may not be considered.

BRIEF DESCRIPTION OF THE DRAWINGS

FIG. 5 is a schematic view of a phase relationship between an X axis and a Z axis of the wheel.

FIG. 6 is a flow chart of an operation S13 shown in the embodiment of FIG. 1.

FIG. 7 is a flow chart of an operation S132 shown in the embodiment of FIG. 6.

FIG. 8a is a schematic view of phase relationships between an X axis and an Z axis of the wheel when starting points for sampling the Z-axis acceleration are at a first position.

DETAILED DESCRIPTION

Technical solutions of embodiments of the present disclosure will be illustrated in detail by referring to accompanying drawings.

In order to illustrate, but not to limit, the present disclosure, following description provides details, such as specific systemic structures, interfaces, technologies, and so on, to comprehensively understand the present disclosure.

The terms "system" and "network" may often be used interchangeably throughout the present disclosure. The term "and/or" in the present disclosure is used to describe association relationship between associated objects, indicating that three relationships may be available. For example, A and/or B may indicate: presence of A alone, presence of both A and B, and presence of B alone. In addition, the character "/" in the present disclosure may indicate the relationship between the object in front of "/" and the associated object after "/" is an "or" relationship. In addition, "plurality of" in the present disclosure may indicate two or more than two.

Figure 1:
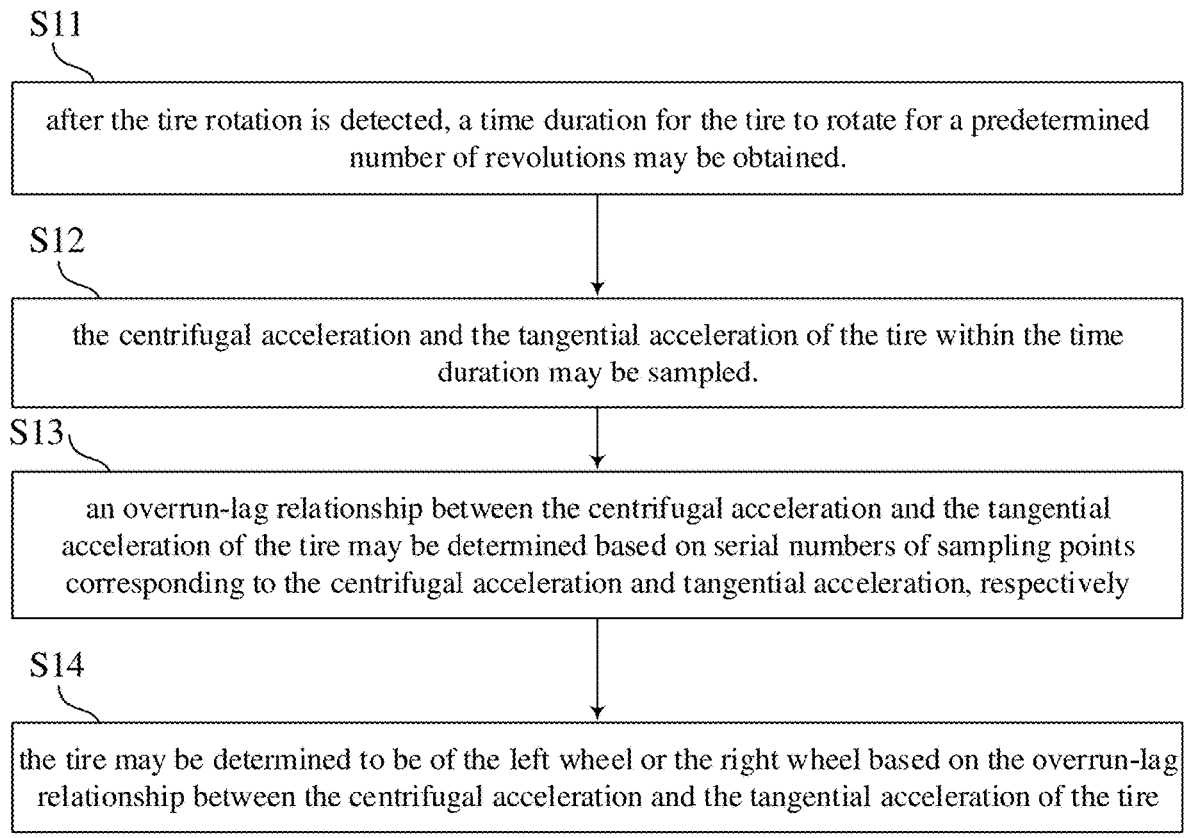
FIG. 1 is a flow chart of a method for positioning a left wheel and a right wheel according to an embodiment of the present disclosure.

As shown in FIG. 1, a flow chart of a method for determining a left wheel and a right wheel according to an embodiment of the present disclosure is provided. In detail, the method may include following operations.

In an operation S11, after the wheel rotation is detected, a time duration for the wheel to rotate for the predetermined number of revolutions may be obtained.

It should be understood that, in the present disclosure, the time duration for the wheel to rotate for the predetermined number of revolutions may be obtained by obtaining a current moving speed of the vehicle, obtaining a rotation period of the wheel based on the moving speed and a radius of the wheel. The time duration for the wheel to rotate for the predetermined number of revolutions may be a product of the number of revolutions and the rotation period of the wheel. In an embodiment, an angular velocity of the wheel may be obtained first. The time duration for the wheel to rotate for the predetermined number of revolutions may be obtained based on a correspondence relationship between the angular velocity and the rotation period of the wheel.

Figure 2:
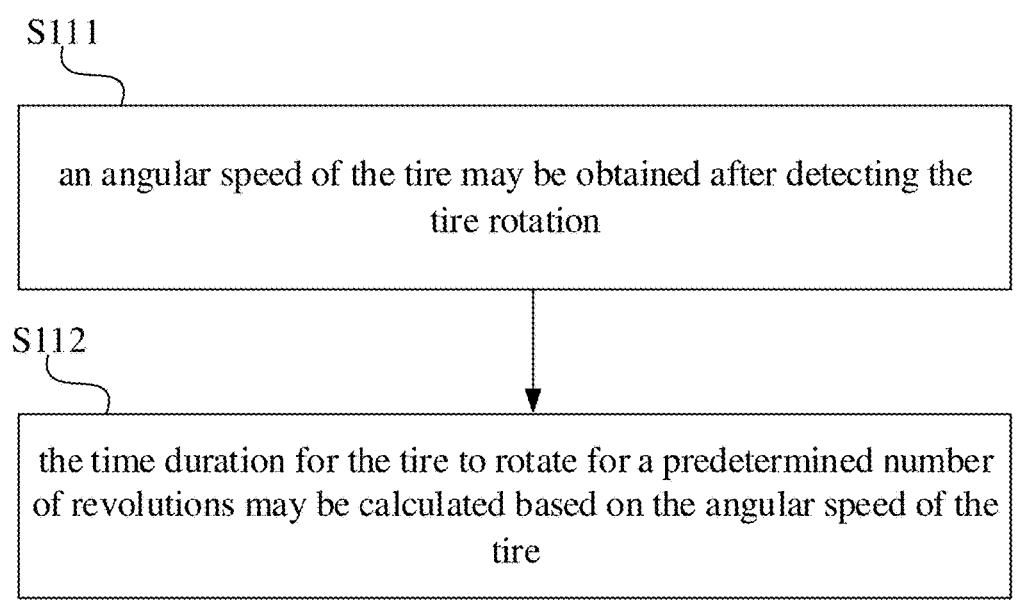
FIG. 2 is a flow chart of performing an operation S11 according to an embodiment shown in FIG. 1.

In detail, as shown in FIG. 2, a flow chart of performing the operation S11 shown in FIG. 1 is provided. In an embodiment, the operation S11 may include following operations.

In an operation S111, the angular velocity of the wheel may be obtained after the wheel rotation being detected.

In an operation S112, the time duration for the wheel to rotate for the predetermined number of revolutions may be calculated based on the angular velocity of the wheel.

It should be understood that after obtaining the angular velocity $\omega$ of the wheel, since the angular velocity $\omega$ is equal to $2\pi$ divided by the period T, the time duration for the wheel to rotate for the predetermined number of revolutions may be calculated based on the angular velocity $\omega$ of the wheel, via the equation $t=T*a=2\pi a/\omega$. The a may be the number of revolutions. For example, when the predetermined number of revolutions is half revolution, the time duration for the wheel to rotate for the half revolution may be $t=T/2=\pi/\omega$.

In an implementation, the operation S111 may specifically include: obtaining the centrifugal acceleration of the wheel, and determining whether the centrifugal acceleration of the wheel is greater than a predetermined threshold, and calculating the angular velocity of the wheel based on the centrifugal acceleration of the wheel, in response to the centrifugal acceleration of the wheel being greater than the predetermined threshold.

In detail, a centrifugal acceleration sensor may be configured on the wheel, such as at a predetermined location of the wheel. The centrifugal acceleration sensor may be configured to detect an acceleration of the wheel in a centripetal direction. That is, the centrifugal acceleration of the wheel may be monitored by the centrifugal acceleration sensor, such that it may be determined whether the wheel is rotating. When the centrifugal acceleration of the wheel is monitored to be greater than a certain acceleration value, the centrifugal acceleration may be obtained by $Az=\omega 2*r$. The r is the radius of the wheel. Therefore, the angular velocity of the wheel $\omega=(Az/r)^{0.5}$ may be calculated based on the centrifugal acceleration of the wheel. In this way, the time duration for the wheel to rotate for one revolution may be obtained by $T=2\pi*(r/Az)^{0.5}$. Therefore, the time duration for the wheel to rotate for the predetermined number of revolutions may be $t=T*a=2\pi*a*(r/Az)^{0.5}$.

In an operation S12, the centrifugal acceleration and the tangential acceleration of the wheel within the time duration may be sampled.

It should be understood that a tangential acceleration sensor may further be configured on the wheel, such as at a predetermined location of the wheel. The tangential acceleration sensor may be configured to detect the acceleration of the wheel in the tangential direction. In this way, within the time duration t for the wheel to rotate for the predetermined number of revolutions, the centrifugal acceleration and tangential acceleration of the wheel may be sampled for a plurality of times by the centrifugal acceleration sensor and the tangential acceleration sensor respectively. That is, the centrifugal acceleration and tangential acceleration of the wheel may be sampled at a plurality of time points, such that a plurality of sampling time-points of the centrifugal acceleration and the tangential acceleration may be obtained. For each sampling, the centrifugal acceleration and the tangential acceleration of a corresponding wheel may be obtained. The number of times for sampling may be determined according to the actual needs, such as 12 times, 24 times, 33 times, etc. In addition, a time interval between two adjacent sampling should be equal. Therefore, when sampling is performed for n times in the time duration t, the time duration t may be divided into n−1 time intervals, i.e., the time interval between two adjacent sampling may be $t/(n-1)$.

In an operation S13, an overrun-lag relationship between the centrifugal acceleration and the tangential acceleration of the wheel may be determined based on serial numbers of sampling time-points corresponding to the centrifugal acceleration and tangential acceleration, respectively.

It should be understood that, within the time duration for the wheel to rotate for the half revolution, the centrifugal accelerations detected by the centrifugal acceleration sensor may be different at different sampling time points, and the tangential accelerations detected by the tangential acceleration sensor may be different at different sampling time points. That is, the centrifugal acceleration and the tangential acceleration may vary. For example, within the time duration for the wheel to rotate for the half revolution, the centrifugal acceleration tends to increase or decrease, and the tangential acceleration tends to decrease or increase, etc. Therefore, variation of the centrifugal acceleration and the tangential acceleration may be obtained based on the serial numbers of the sampling time-points corresponding to the centrifugal accelerations and the tangential accelerations. In this way, the overrun-lag relationship between the centrifugal acceleration and the tangential acceleration of the wheel may be determined. The overrun-lag relationship between the centrifugal acceleration and the tangential acceleration may refer to the centrifugal acceleration overrunning or lagging behind the tangential acceleration.

In an operation S14, the wheel may be determined to be the left wheel or the right wheel based on the overrun-lag relationship between the centrifugal acceleration and the tangential acceleration of the wheel.

Figure 3:
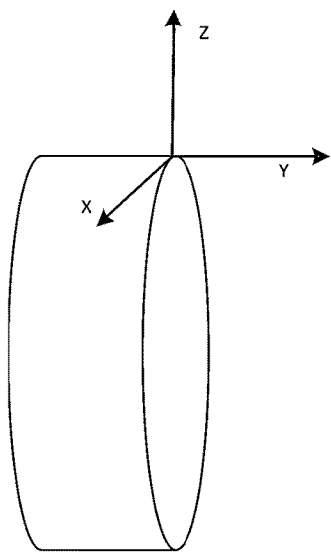
FIG. 3 is a schematic view of a sensor detecting an acceleration direction.
Figure 4:
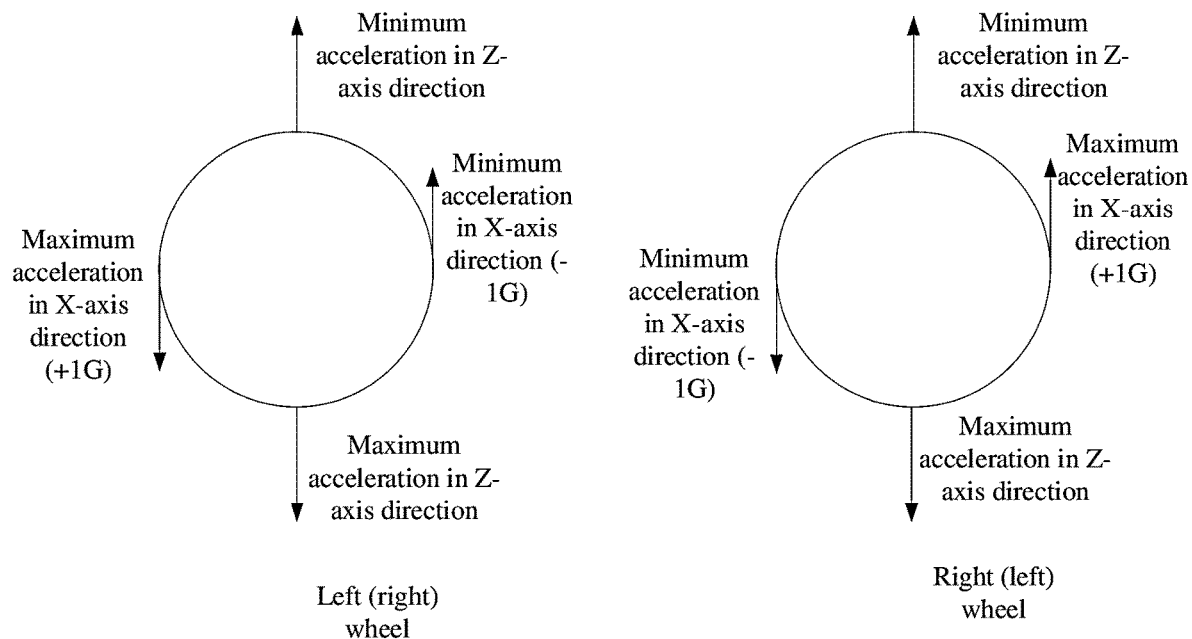
FIG. 4 is a schematic view showing magnitude of an acceleration while a wheel is rotating.

FIG. 3 is a schematic view of a direction of the acceleration of the wheel detected by the sensor, FIG. 4 is schematic view of magnitude of the acceleration of the wheel while the wheel is rotating, and FIG. 5 is a schematic view of a phase relationship between an X axis and a Z axis of the wheel. As shown in FIG. 3, the centrifugal acceleration sensor may be configured to detect the acceleration in the centripetal direction of the wheel. That is, the centrifugal acceleration sensor may detect the acceleration in the Z-axis direction. The tangential acceleration sensor may be configured to detect the acceleration in the tangential direction of the wheel. That is, the tangential acceleration sensor may detect the acceleration in the X-axis direction. It should be understood that, while rotating, since rotation directions of the left wheel and the right wheel may be opposite when viewed from a driver's perspective, where one wheel is rotating clockwise and the other wheel is rotating counterclockwise. Magnitude of the accelerations in the Z-axis direction and the accelerations in the X-axis may be shown in FIGS. 4 and 5. It should be understood that, when the vehicle is in moving forwardly, a left diagram in FIG. 4 may show the magnitude of the acceleration of the left wheel while the left wheel is rotating, and a right diagram in FIG. 4 may show the magnitude of the acceleration of the right wheel while the right wheel is rotating. When the vehicle is moving reversely, the situation may be opposite. That is, the left diagram in FIG. 4 may show the magnitude of the acceleration of the wheel of the right wheel while the right wheel is rotating, and the right diagram in FIG. 4 may show the magnitude of the acceleration of the wheel of the left wheel while the left wheel is rotating. The present disclosure is illustrated by taking the vehicle moving forwardly as an example. In detail, while the left wheel is rotating for one revolution, the acceleration in the X-axis direction reaching a maximum value, the acceleration in the Z-axis direction reaching a maximum value, the acceleration in the X-axis direction reaching a minimum value and the acceleration in the Z-axis direction reaching a minimum value may occur successively. While the right wheel is rotating for one revolution, the acceleration in the Z-axis direction reaching the maximum value, the acceleration in the X-axis direction reaching the maximum value, the acceleration in the Z-axis direction reaching the minimum, and the acceleration in the X-axis direction reaching the minimum may occur successively. It can be found that the acceleration in the X-axis direction of the left wheel may overrun the acceleration in the Z-axis direction by 90 degrees, whereas the acceleration in the X-axis direction of the right wheel may lag behind the acceleration in the Z-axis direction by 90 degrees. In this way, the wheel may be determined to be the left wheel or the right wheel based on the overrun-lag relationship between the centrifugal acceleration and the tangential acceleration of the wheel. In addition, for a product having high requirements about the TPMS power consumption, the less power consumption (time) consumed for determining the wheel to be the left wheel and the right wheel, the more beneficial to the service life of the product. Accordingly, the phase may certainly be determined within one revolution, and in an extreme situation, the phase may certainly be determined when the wheel rotates for half revolution. Therefore, the predetermined number of revolutions may be greater than or equal to the half revolution and less than or equal to one revolution. In this case, the time duration for the wheel to rotate for the predetermined number of revolutions may be half to one of a product of the number of revolutions and the time period.

In one embodiment, the operation S14 may include following operations. The moving direction of the vehicle may be determined as a forward direction or a reversed direction. When the vehicle moves forwardly, the wheel may be determined to be the left wheel in response to the centrifugal acceleration of the wheel lagging behind the tangential acceleration of the wheel, and the wheel may be determined to be of the right wheel in response to the centrifugal acceleration of the wheel overrunning the tangential acceleration of the wheel. When the vehicle moves reversely, the wheel may be determined to be the right wheel in response to the centrifugal acceleration of the wheel lagging behind the tangential acceleration of the wheel, and the wheel may be determined to be the left wheel in response to the centrifugal acceleration of the wheel overrunning the tangential acceleration of the wheel.

According to the above results, when the vehicle moves forwardly and when the wheel is rotating for one revolution, the acceleration in the X-axis direction of the left wheel overruns the acceleration in the Z-axis direction of the left wheel by 90 degrees, whereas the acceleration in the X-axis direction of the right wheel lags behind the acceleration in the Z-axis direction of the right wheel by 90 degrees. Therefore, based on the overrun-lag relationship between the centrifugal acceleration of the wheel and the tangential acceleration of the wheel, the wheel may be determined to be the left wheel in response to the centrifugal acceleration of the wheel lagging behind the tangential acceleration of the wheel, and the wheel may be determined to be the right wheel in response to the centrifugal acceleration of the wheel overrunning the tangential acceleration of the wheel. Similarly, when the vehicle is moving reversely, the wheel may be determined to be the right wheel in response to the centrifugal acceleration of the wheel lagging behind the tangential acceleration of the wheel, and the wheel may be determined to be the left wheel in response to the centrifugal acceleration of the wheel overrunning the tangential acceleration of the wheel.

In the present embodiment, the wheel may be determined to be the left wheel or the right wheel based on the overrun-lag relationship between the centrifugal acceleration and tangential acceleration of the wheel. Specific values of the accelerations may not be analyzed. The requirement for the accuracy of the acceleration sensor may not be high. In addition, the time for sampling the accelerations may be the time duration for the wheel to rotate for the predetermined number of revolutions. The power consumption of the product may be low. Only the maximum centrifugal acceleration, the minimum centrifugal acceleration, the maximum tangential acceleration and the minimum tangential acceleration are stored, having low requirements for the storage space of the product.

FIG. 6 is a flow chart of the operation S13 shown in FIG. 1. In the present embodiment, the operation S13 may include following operations.

In an operation S131, a serial number of a first sampling time-point corresponding to the maximum centrifugal acceleration within the time duration, a serial number of a second sampling time-point corresponding to the minimum centrifugal acceleration within the time duration, a serial number of a third sampling time-point corresponding to the maximum tangential acceleration within the time duration, and a serial number of a fourth sampling time-point corresponding to the minimum tangential acceleration within the time duration may be obtained.

Referring to FIG. 5, it should be understood that, within the time duration t for the wheel to rotate for the predetermined number of revolutions, the centrifugal acceleration may be sampled for n times (that is, sampled at n time points respectively) by the centrifugal acceleration sensor, and the tangential acceleration of the wheel may be sampled for n times (that is, sampled at n time points respectively) by the tangential acceleration sensor. The time interval between two adjacent sampling time points may be $t/(n-1)$. Therefore, n centrifugal acceleration values and n tangential acceleration values may be obtained. The serial numbers of the sampling time-points of the centrifugal acceleration and the tangential acceleration may be recorded as P1 to Pn. That is, starting from the first sampling time-point, the sampling time-points may be recorded as P1, P2, P3 and Pn. For example, P1=0, P2=1, P3=2 and so on. Therefore, while sampling within the time duration t for the wheel to rotate for the predetermined number of revolutions, the centrifugal acceleration and the tangential acceleration obtained from every two adjacent sampling time-points may be compared successively, and the maximum centrifugal acceleration Zmax, the minimum centrifugal acceleration Zmin, the maximum tangential acceleration Xmax, and the minimum tangential acceleration Xmin may be determined within the time duration t for the wheel to rotate for the predetermined number of revolutions. A sampling time-point corresponding to the maximum centrifugal acceleration Zmax may be taken as a first target sampling time-point, and a serial number of the first target sampling time-point may be obtained and recorded Pzmax. A sampling time-point corresponding to the minimum centrifugal acceleration Zmin may be taken as a second target sampling time-point, and a serial number of the second target sampling time-point may be obtained and recorded as Pzmin. A sampling time-point corresponding to the maximum tangential acceleration Xmax may be taken as a third target sampling time-point, and a serial number of the third target sampling time-point may be obtained and recorded as Pxmax. A sampling time-point corresponding to the minimum tangential acceleration Xmin may be taken as a fourth target sampling time-point, and a serial number of the fourth target sampling time-point may be obtained and recorded as Pxmin Each of the serial number Pzmax of the first target sampling time-point, the serial number Pzmin of the second target sampling time-point, the serial number Pxmax of the third target sampling time-point, and the serial number Pxmin of the fourth target sampling time-point may be one of the serial numbers P1 to Pn of the sampling time-points.

In an operation S132, the overrun-lag relationship between the centrifugal acceleration and the tangential acceleration of the wheel may be determined based on the serial number of the first target sampling time-point, the serial number of the second target sampling time-point, the serial number of the third target sampling time-point, and the serial number of the fourth target sampling time-point.

It should be understood that, after obtaining the serial number Pzmax of the first target sampling time-point for the maximum centrifugal acceleration Zmax, the serial number Pzmin of the second target sampling time-point for the minimum centrifugal acceleration Zmin, the serial number Pxmax of the third target sampling time-point for the maximum tangential acceleration Xmax, and the serial number Pxmin of the fourth target sampling time-point for the minimum tangential acceleration Xmin, variation in the centrifugal acceleration and the tangential acceleration may be obtained based on time points at which the serial number Pzmax of the first target sampling time-point, the serial number Pzmin of the second target sampling time-point, the serial number Pxmax of the third target sampling time-point, and the serial number Pxmin of the fourth target sampling time-point occur respectively. In this way, the centrifugal acceleration may be determined as overrunning or lagging behind the tangential acceleration. That is, the overrun-lag relationship between the centrifugal acceleration and the tangential acceleration of the wheel may be determined. In the present embodiment, as the overrun-lag relationship between the centrifugal acceleration and the tangential acceleration of the wheel is determined by comparing the serial numbers of the target sampling time-points corresponding to the maximum acceleration and the minimum acceleration. The acceleration sensor having relatively low accuracy may be configured, and the accuracy of the acceleration sensor may not be considered.

FIG. 7 is a flow chart of the operation S132 shown in FIG. 6. In the present embodiment, the operation S132 may include following operations.

In an operation S1321, the serial number of the first target sampling time-point and the serial number of the second target sampling time-point may be compared, and a state of the centrifugal acceleration of the wheel within the time duration may be determined as an increasing state or a decreasing state. The serial number of the third target sampling time-point and the serial number of the fourth target sampling time-point may be compared, and a state of the tangential acceleration of the wheel within the time duration may be determined as an increasing state or a decreasing state.

In detail, after obtaining the serial number Pzmax of the first target sampling time-point for the maximum centrifugal acceleration Zmax, the serial number Pzmin of the second target sampling time-point for the minimum centrifugal acceleration Zmin, the serial number Pxmax of the third target sampling time-point for the maximum tangential acceleration Xmax, and the serial number Pxmin of the fourth target sampling time-point for the minimum tangential acceleration Xmin, the serial number Pzmax of the first target sampling time-point and the serial number Pzmin of the second target sampling time-point may be compared, such that the state of the centrifugal acceleration of the wheel within the time duration t may be determined as the increasing state or the decreasing state. When the serial number Pzmax of the first target sampling time-point is greater than the serial number Pzmin of the second target sampling time-point, the state of the centrifugal acceleration of the wheel within the time duration t may be determined as the increasing state. When the serial number Pzmax of the first target sampling time-point is less than the serial number Pzmin of the second target sampling time-point, the state of the centrifugal acceleration of the wheel within the time duration t may be determined as the decreasing state. Similarly, the serial number Pxmax of the third target sampling time-point and the serial number Pxmin of the fourth target sampling time-point may be compared, such that the state of the tangential acceleration of the wheel within the time duration t may be determined as the increasing state or the decreasing state. When the serial number Pxmax of the third target sampling time-point is greater than the serial number Pxmin of the fourth target sampling time-point, the state of the tangential acceleration of the wheel within the time duration t may be determined as the increasing state. When the serial number Pxmax of the third target sampling time-point is less than the serial number Pxmin of the fourth target sampling time-point, the state of the tangential acceleration of the wheel within the time duration t may be determined as the decreasing state.

In an operation S1322, the overrun-lag relationship between the centrifugal acceleration of the wheel and the tangential acceleration of the wheel may be determined based on the state of the centrifugal acceleration of the wheel and the state of the tangential acceleration of the wheel.

It should be understood that the centrifugal acceleration may be determined as overrunning or lagging behind the tangential acceleration based on whether the centrifugal acceleration is in the increasing or decreasing state and whether the tangential acceleration is in the increasing or decreasing state, and based on the sampling time points at which the maximum and minimum values of the accelerations occur.

In an implementation, the operation S1322 may include following operations. A first sum of the serial number of the first target sampling time-point and the serial number of the second target sampling time-point may be obtained. A second sum of the serial number of the third target sampling time-point and the serial number of the fourth target sampling time-point may be obtained. When the centrifugal acceleration and the tangential acceleration are in a same state, the centrifugal acceleration of the wheel may be determined as lagging behind the tangential acceleration of the wheel in response to the first sum being greater than the second sum; and the centrifugal acceleration of the wheel may be determined as overrunning the tangential acceleration of the wheel in response to the first sum being less than the second sum. When the centrifugal acceleration and the tangential acceleration are in different states, the centrifugal acceleration of the wheel may be determined as overrunning the tangential acceleration of the wheel in response to the first sum being greater than the second sum; and the centrifugal acceleration of the wheel may be determined as lagging behind the tangential acceleration of the wheel in response to the first sum being less than the second sum.

In detail, the serial number Pzmax of the first target sampling time-point and the serial number Pzmin of the second target sampling time-point may be compared, the state of the centrifugal acceleration of the wheel within time duration t may be determined as the increasing state or the decreasing state. The serial number Pxmax of the third target sampling time-point and the serial number Pxmin of the fourth target sampling time-point may be compared, the state of the tangential acceleration of the wheel within time duration t may be determined as the increasing state or the decreasing state. In addition, a first sum Pzmax+Pzmin of the serial number of the first target sampling time-point and the serial number of the second target sampling time-point may be obtained. A second sum Pxmax+Pxmin of the serial number of the third target sampling time-point and the serial number of the fourth target sampling time-point may be obtained. It should be understood that, when the centrifugal acceleration and the tangential acceleration are both in the increasing state or both in the decreasing state, the sampling time point at which the centrifugal acceleration is in the current state may be determined as later than the sampling time point at which the tangential acceleration is in the current state in response to the first sum Pzmax+Pzmin being greater than the second sum Pxmax+Pxmin, indicating that the centrifugal acceleration of the wheel lags behind the tangential acceleration of the wheel. The sampling time point at which the centrifugal acceleration is in the current state may be determined as earlier than the sampling time point at which the tangential acceleration is in the current state in response to the first sum Pzmax+Pzmin being less than the second sum Pxmax+Pxmin, indicating that the centrifugal acceleration of the wheel overruns the tangential acceleration of the wheel. Similarly, when one of the centrifugal acceleration and the tangential acceleration is in the increasing state and the other one is in the decreasing state, the tangential acceleration may be determined as being in the current state while the centrifugal acceleration has passed the current state, in response to the first sum Pzmax+Pzmin being greater than the second sum Pxmax+Pxmin, indicating that the centrifugal acceleration of the wheel overruns the tangential acceleration of the wheel. The tangential acceleration may be determined as being in the current state while the centrifugal acceleration has not reached the current state, in response to the first sum Pzmax+Pzmin being less than the second sum Pxmax+Pxmin, indicating that the centrifugal acceleration of the wheel lags behind the tangential acceleration of the wheel.

Figure 8B:
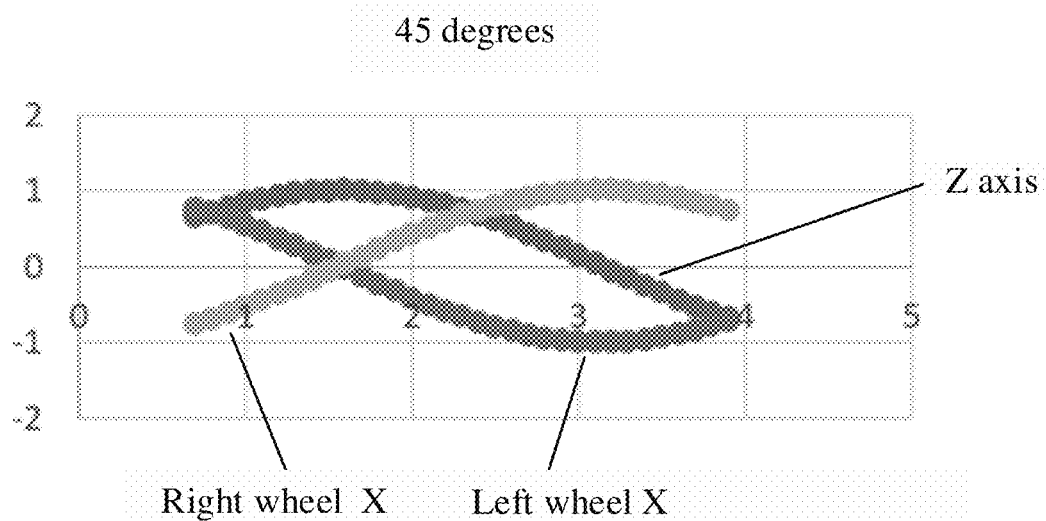
FIG. 8b is a schematic view of phase relationships between an X axis and an Z axis of the wheel when starting points for sampling the Z-axis acceleration are at a second position.
Figure 8C:
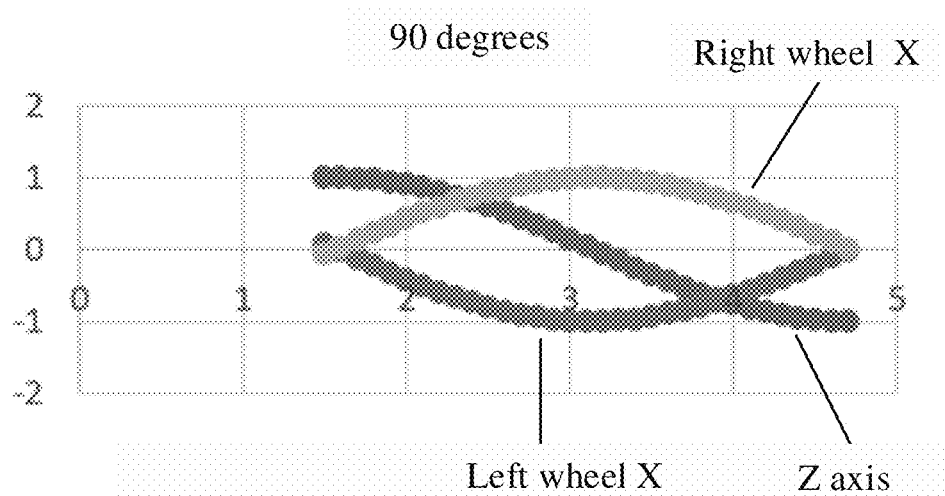
FIG. 8c is a schematic view of phase relationships between an X axis and an Z axis of the wheel when starting points for sampling the Z-axis acceleration are at a third position.
Figure 8D:
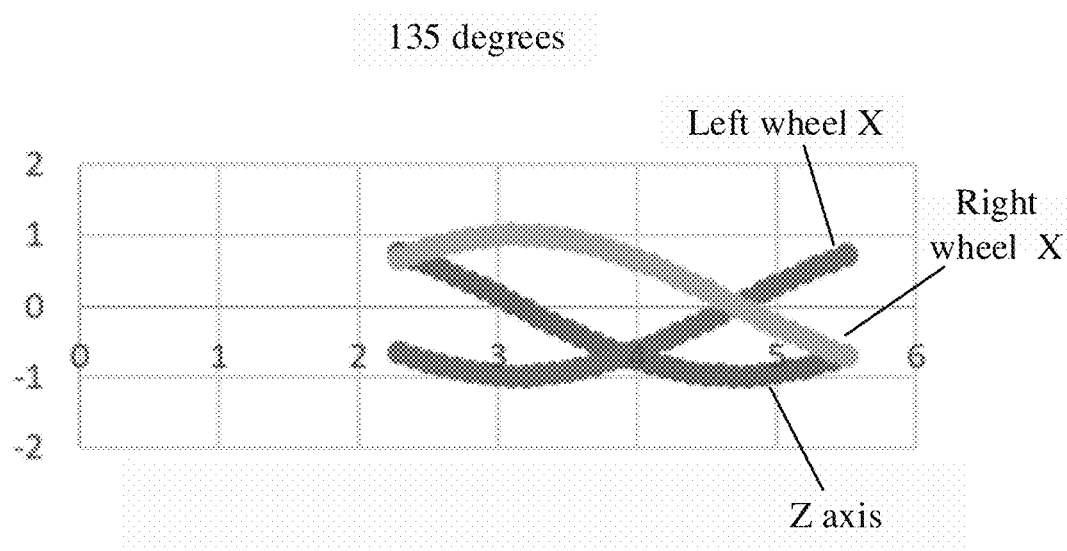
FIG. 8d is a schematic view of phase relationships between an X axis and an Z axis of the wheel when starting points for sampling the Z-axis acceleration are at a fourth position.
Figure 8E:
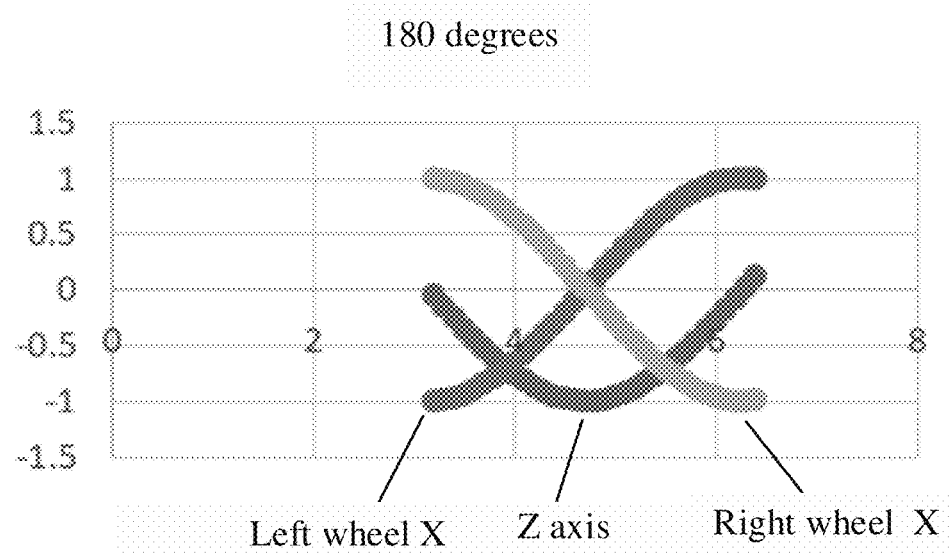
FIG. 8e is a schematic view of phase relationships between an X axis and an Z axis of the wheel when starting points for sampling the Z-axis acceleration are at a fifth position.
Figure 8F:
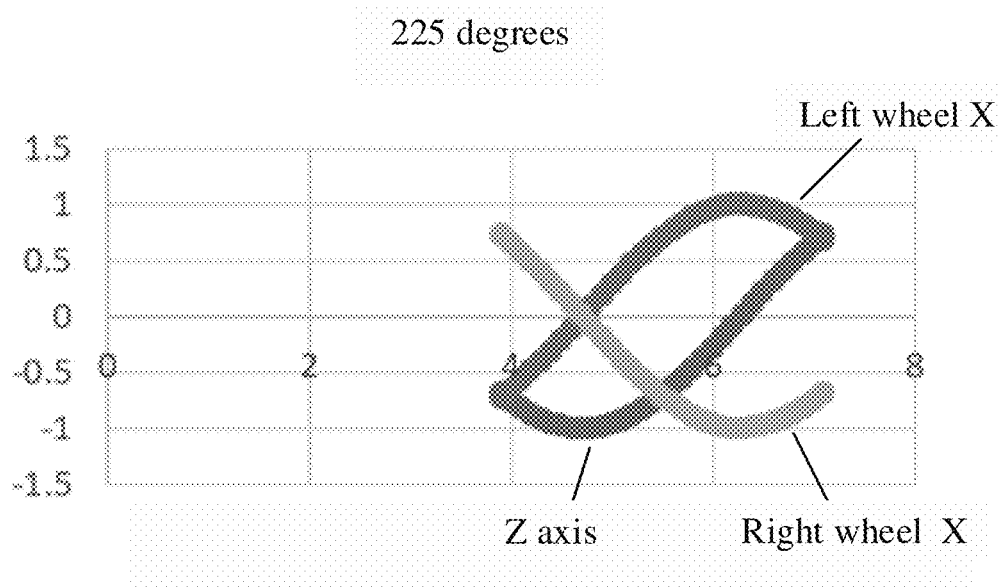
FIG. 8f is a schematic view of phase relationships between an X axis and an Z axis of the wheel when starting points for sampling the Z-axis acceleration are at a sixth position.
Figure 8G:
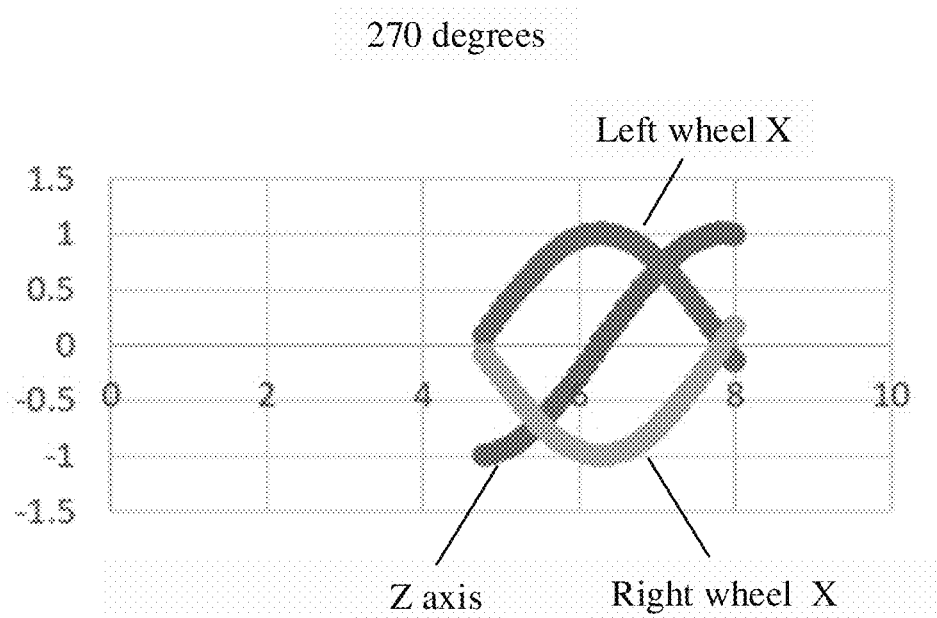
FIG. 8g is a schematic view of phase relationships between an X axis and an Z axis of the wheel when starting points for sampling the Z-axis acceleration are at a seventh position.
Figure 8H:
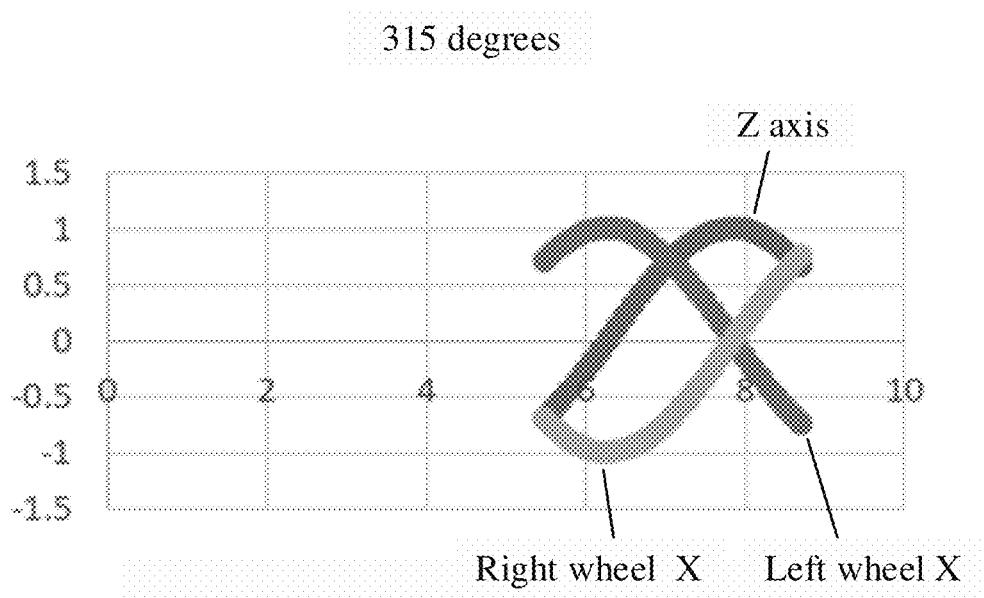
FIG. 8h is a schematic view of phase relationships between an X axis and an Z axis of the wheel when starting points for sampling the Z-axis acceleration are at an eighth position.

FIGS. 8a to 8h show schematic views of phase relationships between the X axis and the Z axis of the wheel when starting points for sampling the Z-axis acceleration are at different positions. As shown in FIG. 8a, the Z-axis acceleration at 0 degree may be taken as the starting time point for sampling. It can be seen that, the maximum value of Z-axis acceleration may occur near the $16^{th}$ sampling time-point, whereas the minimum value of Z-axis acceleration may occur at the $1^{st}$ sampling time-point or the $33^{rd}$ sampling time-point. Meanwhile, the maximum value of X-axis acceleration of the left wheel may occur at the $1^{st}$ sampling time-point and the minimum value of X-axis acceleration of the left wheel may occur at the $33^{rd}$ sampling time-point. The minimum value of X-axis acceleration of the right wheel may occur at the $1^{st}$ sampling time-point and the maximum value of X-axis acceleration of the right wheel may occur at the $33^{rd}$ sampling time-point. The current state of acceleration may be obtained by subtracting the serial number Pmin of the sampling time-point for the minimum acceleration from the serial number Pmax of the sampling time-point for the maximum acceleration. When Pmax−Pmin>0, the acceleration may be in the increasing state. When Pmax−Pmin<0, the acceleration may be in the decreasing state. The Pmax−Pmin may include Pzmax−Pzmin and Pxmax−Pxmin Subsequently, the magnitude between the first sum Pzmax+Pzmin and the second sum Pxmax+Pxmin may be calculated. When the Z-axis acceleration and X-axis acceleration are both in the increasing state or both in the decreasing state, the X-axis acceleration may be determined as overrunning the Z-axis acceleration in response to Pzmax+Pzmin−(Pxmax+Pxmin) being greater than zero, indicating that the wheel is the left wheel; and the X-axis acceleration may be determined as lagging behind the Z-axis acceleration in response to Pzmax+Pzmin−(Pxmax+Pxmin) being less than zero, indicating that the wheel is the right wheel. When one of the Z-axis acceleration and X-axis acceleration is in the increasing state and the other one is in the decreasing state, the X-axis acceleration may be determined as lagging behind the Z-axis acceleration in response to Pzmax+Pzmin−(Pxmax+Pxmin) being greater than zero, indicating that the wheel is the right wheel; and the X-axis acceleration may be determined as overrunning the Z-axis acceleration in response to Pzmax+Pzmin−(Pxmax+Pxmin) being less than zero, indicating that the wheel is the left wheel. Details may be shown in the following table.

| | acceleration | Serial number of sampling time-points Pmax | Serial number of sampling time-points Pmin | State Pmax − Pmin | Pzmax + Pzmin − (Pxmax + Pxmin) | 1 indicating X overrunning Z, 0 indicating X lagging behind Z |
|---|---|---|---|---|---|---|
| 0° | Z | 16 | 0 | 16 | | |
| | Left X | 0 | 33 | −33 | −17 | 1 |
| | rightX | 33 | 0 | 33 | −17 | 0 |
| | Z | 16 | 33 | −17 | | |
| | Left X | 0 | 33 | −33 | 16 | 1 |
| | rightX | 33 | 0 | 33 | 16 | 0 |

In the above table, the value corresponding to Pmax may be the serial number of the time-point for sampling the maximum acceleration, the value corresponding to Pmin may be the serial number of the time-point for sampling the minimum acceleration. Generally, counting may start from the first sampling time-point, for example the serial number may be recorded as 0, 1, 2 . . . and so on. The increasing state or the decreasing state may be indicated by the value corresponding to Pmax-Pmin. When Pmax-Pmin is greater than 0, the acceleration may be in the increasing state. When Pmax−Pmin is less than 0, the acceleration may be in the decreasing state. In addition, when the Z-axis acceleration and X-axis acceleration are both in the increasing state or both in the decreasing state, Pzmax+Pzmin−(Pxmax+Pxmin) being greater than zero may indicate that the X-axis acceleration overruns the Z-axis acceleration, and Pzmax+Pzmin−(Pxmax+Pxmin) being less than zero may indicate that the X-axis acceleration lags behind the Z-axis acceleration. When one of the Z-axis acceleration and X-axis acceleration is in the increasing state and the other one is in the decreasing state, Pzmax+Pzmin−(Pxmax+Pxmin) being greater than zero may indicate that the X-axis acceleration lags behind the Z-axis acceleration, and Pzmax+Pzmin−(Pxmax+Pxmin) being less than zero may indicate that the X-axis acceleration overruns the Z-axis acceleration. As shown in the above table, regardless of the minimum value of Z-axis acceleration occurring at the $P^t$ point or the $33^{rd}$ point, the X-axis acceleration of the left wheel may always overrun the Z-axis acceleration of the left wheel, and the X-axis acceleration of the right wheel may always lag behind the Z-axis acceleration of the right wheel.

Similarly, an angle of 45 degrees in one rotation revolution may be added successively for verification, verification results may be shown in the following table by referring to FIGS. 8b to 8h.

|  | Acceleration | Serial numbers of sampling time-points Pmax | Serial numbers of sampling time-points Pmin | State Pmax − Pmin | Pzmax + Pzmin − (Pxmax + Pxmin) | 1 indicating X overrunning Z, 0 indicating X lagging behind Z |
|---|---|---|---|---|---|---|
| 45° | Z | 17 | 40 | −23 |  |  |
|  | Left X | 8 | 33 | −25 | 16 | 1 |
|  | rightX | 33 | 8 | 25 | 16 | 0 |
| 90° | Z | 16 | 48 | −32 |  |  |
|  | Left X | 16 | 33 | −17 | 15 | 1 |
|  | rightX | 33 | 16 | 17 | 15 | 0 |
|  | Z | 16 | 48 | −32 |  |  |
|  | Left X | 48 | 33 | 15 | −17 | 1 |
|  | rightX | 33 | 16 | 17 | 15 | 0 |
|  | Z | 16 | 48 | −32 |  |  |
|  | Left X | 48 | 33 | 15 | −17 | 1 |
|  | rightX | 33 | 48 | −15 | −17 | 0 |
|  | Z | 16 | 48 | −32 |  |  |
|  | Left X | 16 | 33 | −17 | 15 | 1 |
|  | rightX | 33 | 48 | −15 | −17 | 0 |
| 135° | Z | 24 | 48 | −24 |  |  |
|  | Left X | 56 | 33 | 23 | −17 | 1 |
|  | rightX | 33 | 56 | −23 | −17 | 0 |
| 180° | Z | 33 | 48 | −15 |  |  |
|  | Left X | 56 | 33 | 23 | −8 | 1 |
|  | rightX | 33 | 56 | −23 | −8 | 0 |
|  | Z | 65 | 48 | 17 |  |  |
|  | Left X | 65 | 33 | 32 | 15 | 1 |
|  | rightX | 33 | 65 | −32 | 15 | 0 |
| 225° | Z | 72 | 48 | 24 |  |  |
|  | Left X | 65 | 40 | 25 | 15 | 1 |
|  | rightX | 40 | 65 | −25 | 15 | 0 |
| 270° | Z | 80 | 49 | 31 |  |  |
|  | Left X | 64 | 49 | 15 | 16 | 1 |
|  | rightX | 49 | 64 | −15 | 16 | 0 |
|  | Z | 80 | 49 | 31 |  |  |
|  | Left X | 64 | 80 | −16 | −15 | 1 |
|  | rightX | 49 | 64 | −15 | 16 | 0 |
|  | Z | 80 | 49 | 31 |  |  |
|  | Left X | 64 | 80 | −16 | −15 | 1 |
|  | rightX | 80 | 64 | 16 | −15 | 0 |
|  | Z | 80 | 49 | 31 |  |  |
|  | Left X | 64 | 49 | 15 | 16 | 1 |
|  | rightX | 80 | 64 | 16 | −15 | 0 |
| 315° | Z | 80 | 56 | 24 |  |  |
|  | Left X | 64 | 88 | −24 | −16 | 1 |
|  | rightX | 88 | 64 | 24 | −16 | 0 |

The state of the acceleration may be obtained by calculating Pmax-Pmin. By referring to the results of Pzmax+Pzmin-(Pxmax+Pxmin), the above results may meet the overrun-lag relationship of "the X-axis acceleration of the left wheel overrunning the Z-axis acceleration of the left wheel, while the X-axis acceleration of the right wheel lagging behind the Z-axis acceleration of the right wheel". Therefore, the above method may be applicable whenever the sampling starts.

Figure 9:
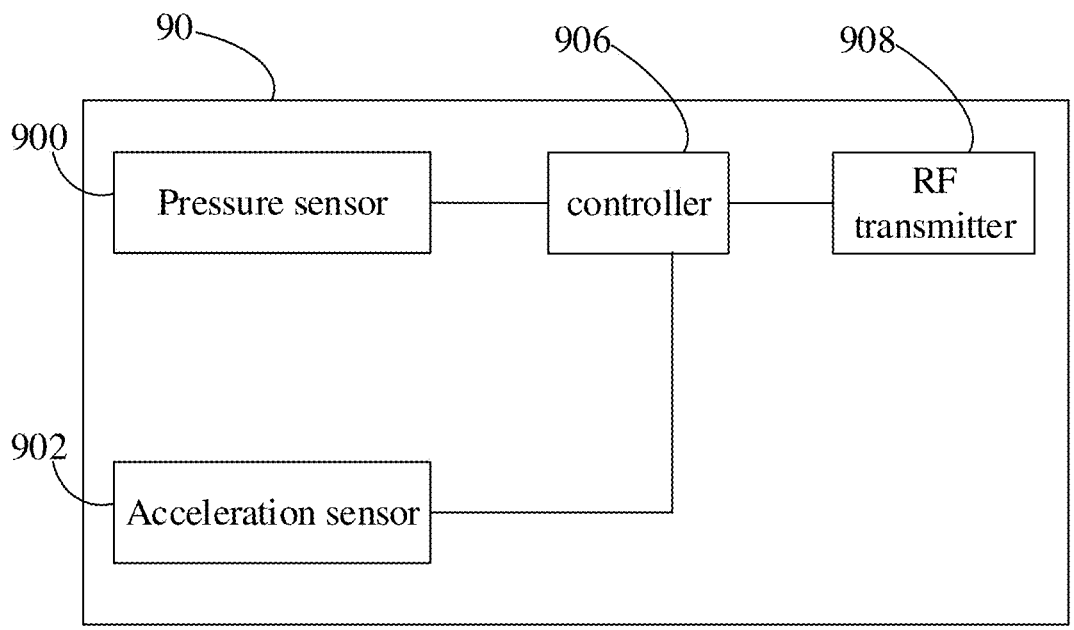
FIG. 9 is a schematic diagram of a wheel pressure monitoring chip according to an embodiment of the present disclosure.

FIG. 9 is a schematic diagram of a wheel pressure monitoring chip according to an embodiment of the present disclosure. The wheel pressure monitoring chip 90 may include: a pressure sensor 900, an acceleration sensor 902, a controller 906, and an RF transmitter 908. The pressure sensor 900 may be configured to detect and obtain pressure data of the wheel. The acceleration sensor 902 may be configured to detect and obtain the centrifugal acceleration and the tangential acceleration of the wheel. The controller 906 may be coupled to the pressure sensor 900 and the acceleration sensor 902, respectively. The controller 906 may be configured to determine the wheel being configured on the left wheel or the right wheel based on the centrifugal acceleration and the tangential acceleration of the wheel detected by the acceleration sensor 902. The controller 906 may be configured to determine the wheel to be the left wheel or the right wheel by performing any of the methods as described in the above. The RF transmitter 908 may be coupled to the controller 906 to send the determination result of the wheel and the pressure data of the wheel to a vehicle processor.

In an embodiment, the above-mentioned acceleration sensor 902 may be a biaxial acceleration sensor that detects the X-axis acceleration and the Z-axis acceleration. Alternatively, the acceleration sensor 902 may be a triaxial acceleration sensor that detects the X-axis acceleration, a Y-axis acceleration and the Z-axis acceleration. In other embodiments, the acceleration sensor 902 may be replaced by a first acceleration sensor and a second acceleration sensor. Each of the first acceleration sensor and the second acceleration sensor may be a single-axial acceleration sensor. The first acceleration sensor may be configured to detect the centrifugal acceleration of the wheel, and the second acceleration sensor may be configured to detect the tangential acceleration of the wheel.

Figure 10:
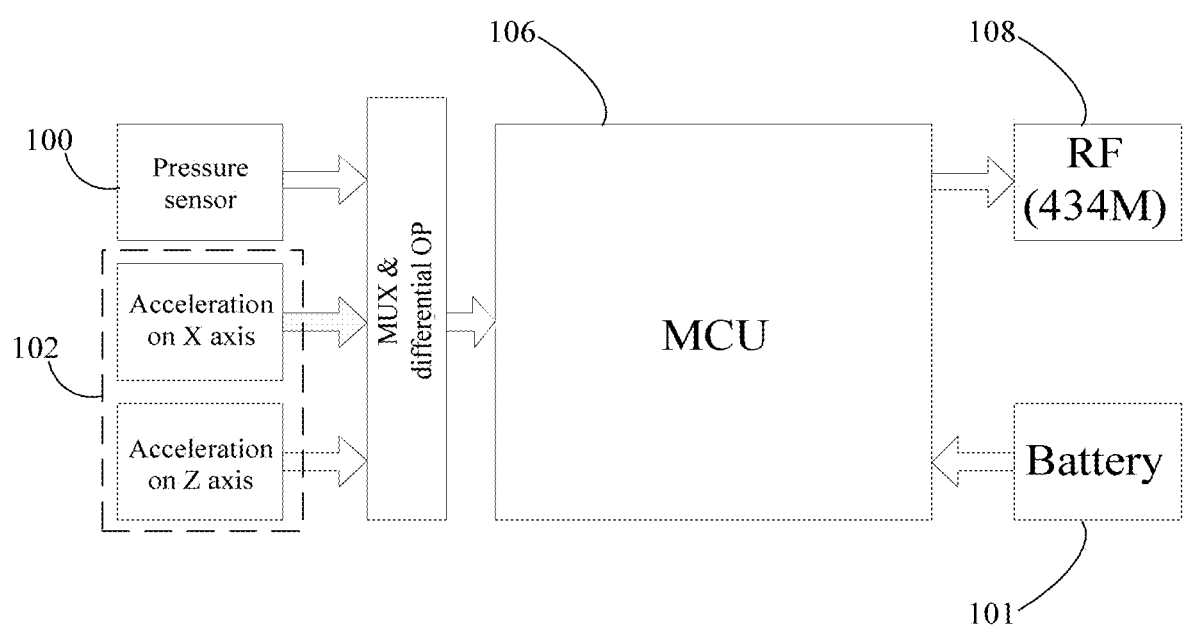
FIG. 10 is a schematic diagram of a wheel pressure monitoring apparatus according to an embodiment of the present disclosure.

FIG. 10 is a schematic diagram of a wheel pressure monitoring apparatus according to an embodiment of the present disclosure. In the present embodiment, the wheel pressure monitoring apparatus 10 may include a wheel pressure monitoring chip and a battery 101. The wheel pressure monitoring chip may be the wheel pressure monitoring chip 90 mentioned in the above embodiment. That is, the wheel pressure monitoring chip in the present embodiment may include a pressure sensor 100, an acceleration sensor 102, a controller 106 and an RF transmitter 108. In detail, the controller 106 may be an MCU (Microcontroller Unit), powered by the battery 101. The pressure sensor 100 and the acceleration sensor 102 may be coupled to MCU through a multiplexer modulator MUX and a differential amplifier circuit, and the like. The RF transmitter 108 may take a 434M antenna for data transmission.

Details about the controller 106 of the present disclosure determining the wheel to be the left wheel or the right wheel may be referred to the wheel determination methods mentioned in the above embodiments and will not be repeatedly described hereinafter.

Figure 11:
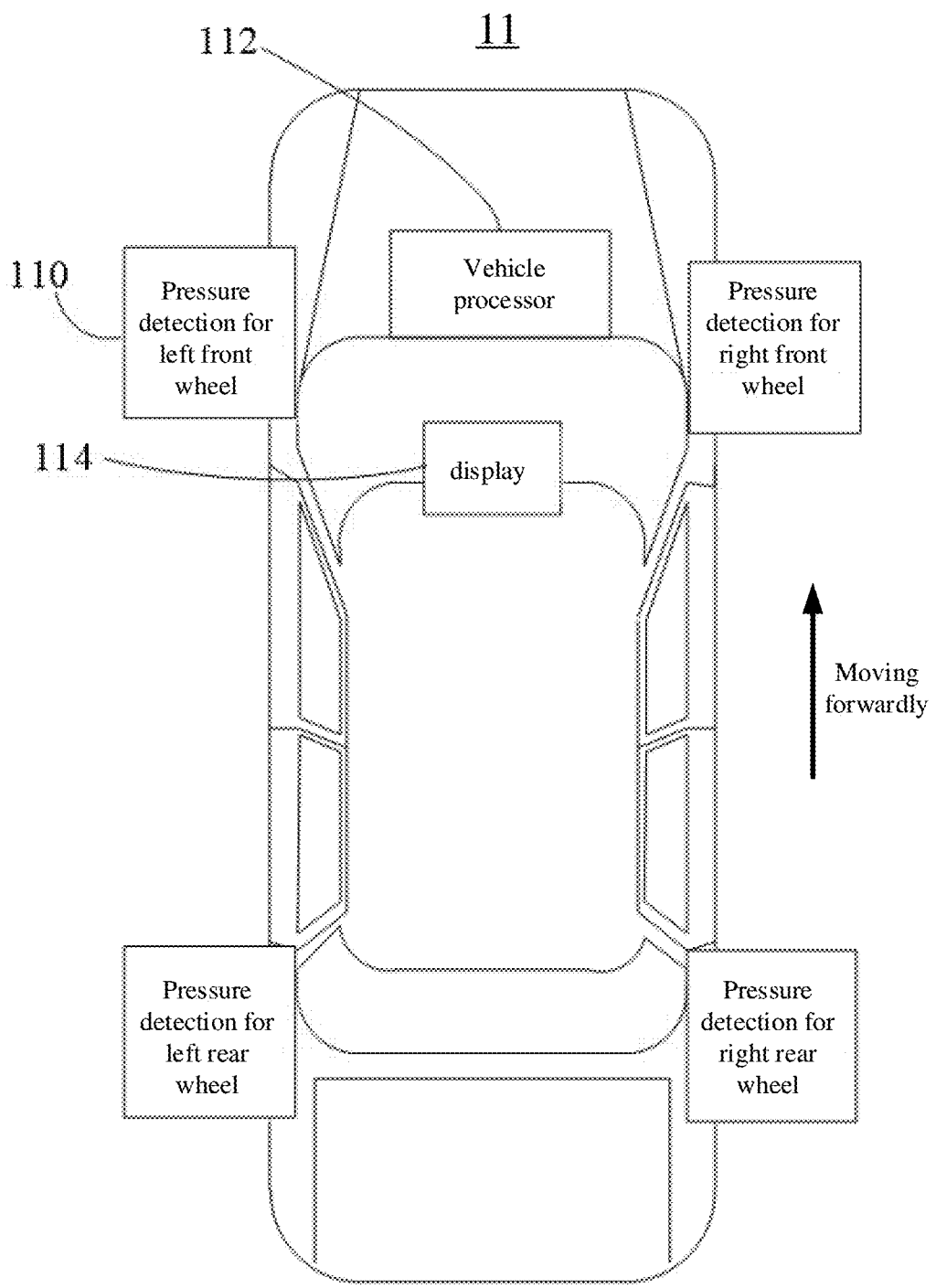
FIG. 11 is a schematic diagram of a wheel pressure monitoring system according to an embodiment of the present disclosure.

FIG. 11 is a schematic diagram of a wheel pressure monitoring system according to an embodiment of the present disclosure. The wheel pressure monitoring system 11 may include a wheel pressure monitoring apparatus 110, a wheel pressure signal receiving apparatus (not shown in the figure), a vehicle processor 112, and a display 114. The wheel pressure monitoring device 110 may be configured on the wheels of the vehicle for detecting the wheel pressure data of the vehicle and positioning the wheels, and may send data signals, such as the positioning results of the wheels and the wheel pressure data, to the wheel pressure signal receiving apparatus. The vehicle processor 112 may be configured to control the display 114 to display the positioning results and pressure data of each wheel based on the positioning results and the pressure data of the wheel received by the wheel pressure signal receiving apparatus. The wheel pressure monitoring apparatus 110 may be any of the wheel pressure monitoring apparatus described in the above. It should be understood that the wheel pressure monitoring apparatus 110 may be configured on each wheel of the vehicle. It should be understood that, in the present disclosure, the wheel may be determined to be the left wheel or the right wheel based on the overrun-lag relationship between the centrifugal acceleration and the tangential acceleration of the wheel. The wheel of a front wheel or a rear wheel may be determined by the vehicle processor 112 based on strength of the signal received by the wheel pressure signal receiving apparatus.

Further, the display 114 may include a warning light corresponding to each wheel. The vehicle processor 112 may further be configured to: control the warning light corresponding to the wheel to illuminate when the wheel pressure of the wheel is not in a predetermined range. In detail, the display 114 may display pressure of the left front wheel, pressure of the left rear wheel, pressure of the right front wheel and pressure of the right rear wheel. A corresponding warning light for the left front wheel, a corresponding warning light for the left rear wheel, a corresponding warning light for the right front wheel, and a corresponding warning light for the right rear wheel may be configured on the display 114. When the wheel pressure is excessively high or excessively low, the vehicle processor 112 may control the corresponding warning light of the wheel to illuminate for warning.

In detail, the vehicle processor 112 may also be referred to as a CPU (Central Processing Unit). The vehicle processor 112 may be an integrated circuit chip having signal processing capabilities. The vehicle processor 112 may also be a general purpose processor, a Digital Signal Processor (DSP), an Application Specific Integrated Circuit (ASIC), a Field-Programmable Gate Array (FPGA) or other programmable logic devices, a discrete gate or transistor logic device, a discrete hardware component. The general purpose processor may be a microprocessor or any conventional processor. In addition, the vehicle processor 112 may be implemented by an integrated circuit chip.

Figure 12:
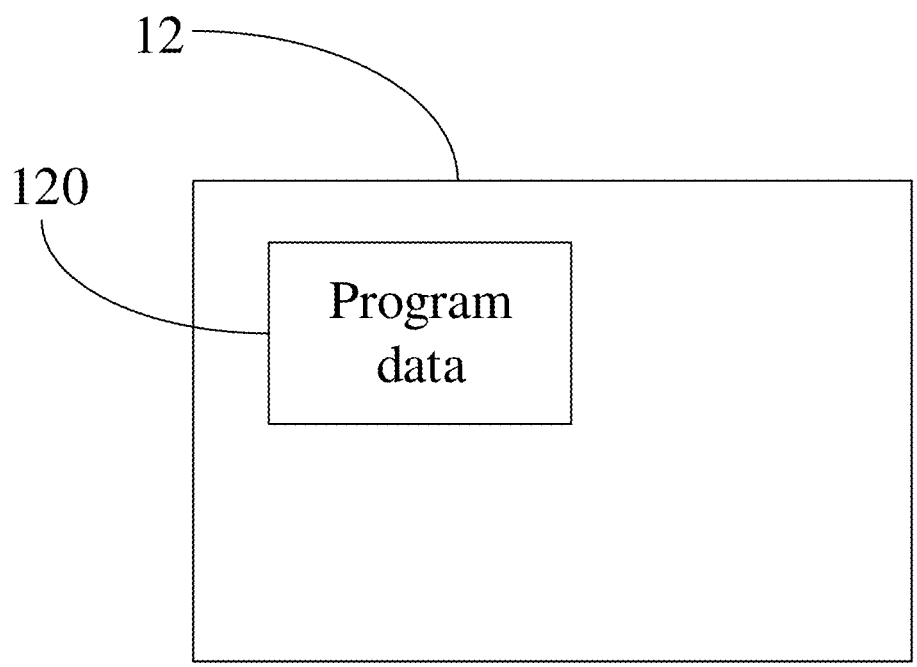
FIG. 12 a schematic diagram of a storage apparatus according to an embodiment of the present disclosure.

FIG. 12 a schematic diagram of a storage apparatus according to an embodiment of the present disclosure. The storage apparatus 12 may be a computer-readable storage medium that stores program data 120 capable of being run by a processor. The program data 120 may be configured to implement the operations in the left and right wheel determination method as described in any one of the above embodiments.

According to various embodiments of the present disclosure, it should be understood that, the disclosed methods, apparatuses and systems may be implemented in other ways. For example, the devices described in the above embodiments are only exemplary. For example, the division of modules or units may be performed based on logical functions. Practically, the modules or units may be divided by other means. For example, the units or components may be combined or integrated into another system, or some features may be omitted, or not implemented. As another aspect, the coupling, the direct coupling or the communicative connection as shown or discussed may be an indirect coupling or communicative connection through some interfaces, some devices or units, which may be electrical, mechanical or by other means.

The units illustrated as separated components may or may not be physically separated. The component displayed as a unit may or may not be a physical unit. That is, the component may be located in one location, or distributed to network units. Some or all of the units may be selected according to practical needs to achieve the purpose of the present disclosure.

In addition, each functional unit in the various embodiments of the present disclosure may be integrated in one single processing unit, or each unit may be physically configured separately. Alternatively, two or more units may be integrated in a single unit. The above integrated units may be implemented either in the form of hardware or in the form of software functional units.

The integrated unit may be stored in a computer readable storage medium when implemented as a software functional unit and sold or used as a separate product. In this way, the essence of the technical solution of the present disclosure, or a part or all of the technical solution of the present disclosure that essentially contributes to the art, may be presented in the form of a software product. The software product may be stored in a storage medium and may include a plurality of instructions to cause a computer device (which may be a personal computer, a server, or a network device, etc.) or a processor to perform all or some of the operations of the methods of each embodiment of the present disclosure. The above-mentioned storage media may include various media that may store program codes, such as a USB drive, a portable hard drive, a Read-Only Memory (ROM), a Random Access Memory (RAM), a magnetic disk or an optical disk.

What is claimed is:

1. A method for detecting wheel, comprising:
    obtaining a time duration for a wheel to rotate for a predetermined number of revolutions after the wheel being detected as rotating;
    sampling centrifugal acceleration and tangential acceleration of the wheel within the time duration, wherein the centrifugal acceleration is obtained by a centrifugal acceleration sensor on the wheel, and the tangential acceleration is obtained by a tangential acceleration sensor on the wheel;
    determining an overrun-lag relationship between the centrifugal acceleration and the tangential acceleration of the wheel based on serial numbers of sampling time-points corresponding to the centrifugal acceleration and serial numbers of sampling time-points corresponding to the tangential acceleration; and
    determining the wheel to be a left wheel or a right wheel based on the overrun-lag relationship between the centrifugal acceleration and the tangential acceleration of the wheel;
    wherein the determining an overrun-lag relationship between the centrifugal acceleration and the tangential acceleration of the wheel based on serial numbers of sampling time-points corresponding to the centrifugal acceleration and serial numbers of sampling time-points corresponding to the tangential acceleration, comprises:
        obtaining a serial number of a first target sampling time-point corresponding to a maximum centrifugal acceleration within the time duration, a serial number of a second target sampling time-point corresponding to a minimum centrifugal acceleration within the time duration, a serial number of a third target sampling time-point corresponding to a maximum tangential acceleration within the time duration, and a serial number of a fourth target sampling time-point corresponding to a minimum tangential acceleration within the time duration; and
        determining the overrun-lag relationship between the centrifugal acceleration and the tangential acceleration of the wheel based on the serial number of the first target sampling time-point, the serial number of the second target sampling time-point, the serial number of the third target sampling time-point, and the serial number of the fourth target sampling time-point;
    wherein the determining the overrun-lag relationship between the centrifugal acceleration and the tangential acceleration of the wheel based on the serial number of the first target sampling time-point, the serial number of the second target sampling time-point, the serial number of the third target sampling time-point, and the serial number of the fourth target sampling time-point, comprises:
        comparing the serial number of the first target sampling time-point and the serial number of the second target sampling time-point to determine a state of the centrifugal acceleration of the wheel to be in an increasing state or a decreasing state within the time duration;
        comparing the serial number of the third target sampling time-point and the serial number of the fourth target sampling time-point to determine a state of the tangential acceleration of the wheel to be in an increasing state or a decreasing state within the time duration; and
        determining the overrun-lag relationship between the centrifugal acceleration of the wheel and the tangential acceleration of the wheel based on the state of the centrifugal acceleration of the wheel and the state of the tangential acceleration of the wheel;
    wherein the determining the overrun-lag relationship between the centrifugal acceleration of the wheel and the tangential acceleration of the wheel based on the state of the centrifugal acceleration of the wheel and the state of the tangential acceleration of the wheel, comprises:
        obtaining a first sum and a second sum, wherein the first sum is a sum of the serial number of the first target sampling time-point and the serial number of the second target sampling time-point, and the second sum is a sum of the serial number of the third target sampling time-point and the serial number of the fourth target sampling time-point;
        when the state of the centrifugal acceleration of the wheel is the same as the state of the tangential acceleration of the wheel, determining that the centrifugal acceleration of the wheel lags behind the tangential acceleration of the wheel in response to the first sum being greater than the second sum; and
        determining that the centrifugal acceleration of the wheel overruns the tangential acceleration of the wheel in response to the first sum being less than the second sum; and when the state of the centrifugal acceleration of the wheel is different from the state of the tangential acceleration of the wheel, determining that the centrifugal acceleration of the wheel overruns the tangential acceleration of the wheel in response to the first sum being greater than the second sum; and determining that the centrifugal acceleration of the wheel lags behind the tangential acceleration of the wheel in response to the first sum being less than the second sum.

2. The method according to claim 1, wherein the determining the wheel to be a left wheel or a right wheel based on the overrun-lag relationship between the centrifugal acceleration and the tangential acceleration of the wheel, comprises:

determining a moving direction of a vehicle to be a forward direction or a reversed direction;

when the moving direction of the vehicle is the forward direction, determining the wheel to be the left wheel in response to the centrifugal acceleration of the wheel lagging behind the tangential acceleration of the wheel, and determining the wheel to be the right wheel in response to the centrifugal acceleration of the wheel overrunning the tangential acceleration of the wheel; and when the moving direction of the vehicle is the reversed direction, determining the wheel to be the right wheel in response to the centrifugal acceleration of the wheel lagging behind the tangential acceleration of the wheel, and determining the wheel to be the left wheel in response to the centrifugal acceleration of the wheel overrunning the tangential acceleration of the wheel.

3. The method according to claim 1, wherein the predetermined number of revolutions is greater than or equal to a half revolution and is less than or equal to one revolution.

4. The method according to claim 1, wherein the sampling centrifugal acceleration and tangential acceleration of the wheel within the time duration, comprises:

sampling the centrifugal acceleration and the tangential acceleration of the wheel at any time point within the time duration.

5. The method according to claim 1, wherein the obtaining a time duration for a wheel to rotate for the predetermined number of revolutions after the wheel being detected as rotating, comprises:

obtaining an angular velocity of the wheel, after the wheel being detected as rotating; and obtaining the time duration for the wheel to rotate for the predetermined number of revolutions based on the angular velocity of the wheel.

6. The method according to claim 5, wherein the obtaining an angular velocity of the wheel, after the wheel being detected as rotating, comprises:

obtaining the centrifugal acceleration of the wheel, and determining whether the centrifugal acceleration of the wheel is greater than a predetermined threshold; and obtaining the angular velocity of the wheel based on the centrifugal acceleration of the wheel in response to the centrifugal acceleration of the wheel being greater than a predetermined threshold.

7. A wheel pressure monitoring chip, comprising:

a pressure sensor, configured to detect and obtain pressure data of a wheel;

an acceleration sensor, configured to detect and obtain the centrifugal acceleration and the tangential acceleration of the wheel;

a controller, coupled to the pressure sensor and acceleration sensor respectively, and configured to determine the wheel to be a left wheel or a right wheel based on the centrifugal acceleration and the tangential acceleration of the wheel detected by the acceleration sensor; and an RF transmitter, coupled to the controller for sending a determination result of the wheel and the pressure data of the wheel to a vehicle processor, wherein the controller is configured to perform operations of:

obtaining a time duration for a wheel to rotate for a predetermined number of revolutions after the wheel being detected as rotating;

sampling centrifugal acceleration and tangential acceleration of the wheel within the time duration;

determining an overrun-lag relationship between the centrifugal acceleration and the tangential acceleration of the wheel based on serial numbers of sampling time-points corresponding to the centrifugal acceleration and serial numbers of sampling time-points corresponding to the tangential acceleration; and determining the wheel to be the left wheel or the right wheel based on the overrun-lag relationship between the centrifugal acceleration and the tangential acceleration of the wheel;

wherein, while determining the overrun-lag relationship between the centrifugal acceleration and the tangential acceleration of the wheel based on serial numbers of sampling time-points corresponding to the centrifugal acceleration and serial numbers of sampling time-points corresponding to the tangential acceleration, the controller is further configured to perform operations of:

obtaining a serial number of a first target sampling time-point corresponding to a maximum centrifugal acceleration within the time duration, a serial number of a second target sampling time-point corresponding to a minimum centrifugal acceleration within the time duration, a serial number of a third target sampling time-point corresponding to a maximum tangential acceleration within the time duration, and a serial number of a fourth target sampling time-point corresponding to a minimum tangential acceleration within the time duration; and determining the overrun-lag relationship between the centrifugal acceleration and the tangential acceleration of the wheel based on the serial number of the first target sampling time-point, the serial number of the second target sampling time-point, the serial number of the third target sampling time-point, and the serial number of the fourth target sampling time-point;

wherein, while determining the overrun-lag relationship between the centrifugal acceleration and the tangential acceleration of the wheel based on the serial number of the first target sampling time-point, the serial number of the second target sampling time-point, the serial number of the third target sampling time-point, and the serial number of the fourth target sampling time-point, the controller is further configured to perform operations of:

comparing the serial number of the first target sampling time-point and the serial number of the second target sampling time-point to determine a state of the centrifugal acceleration of the wheel to be in an increasing state or a decreasing state within the time duration:
comparing the serial number of the third target sampling time-point and the serial number of the fourth target sampling time-point to determine a state of the tangential acceleration of the wheel to be in an increasing state or a decreasing state within the time duration; and
determining the overrun-lag relationship between the centrifugal acceleration of the wheel and the tangential acceleration of the wheel based on the state of the centrifugal acceleration of the wheel and the state of the tangential acceleration of the wheel;
wherein, while determining the overrun-lag relationship between the centrifugal acceleration of the wheel and the tangential acceleration of the wheel based on the state of the centrifugal acceleration of the wheel and the state of the tangential acceleration of the wheel, the controller is further configured to perform operations of:
obtaining a first sum and a second sum, wherein the first sum is a sum of the serial number of the first target sampling time-point and the serial number of the second target sampling time-point, and the second sum is a sum of the serial number of the third target sampling time-point and the serial number of the fourth target sampling time-point:
when the state of the centrifugal acceleration of the wheel is the same as the state of the tangential acceleration of the wheel, determining that the centrifugal acceleration of the wheel lags behind the tangential acceleration of the wheel in response to the first sum being greater than the second sum; and determining that the centrifugal acceleration of the wheel overruns the tangential acceleration of the wheel in response to the first sum being less than the second sum; and
when the state of the centrifugal acceleration of the wheel is different from the state of the tangential acceleration of the wheel, determining that the centrifugal acceleration of the wheel overruns the tangential acceleration of the wheel in response to the first sum being greater than the second sum; and determining that the centrifugal acceleration of the wheel lags behind the tangential acceleration of the wheel in response to the first sum being less than the second sum.

8. The wheel pressure monitoring chip according to claim 7, wherein while determining the wheel to be the left wheel or the right wheel based on the overrun-lag relationship between the centrifugal acceleration and the tangential acceleration of the wheel, the controller is further configured to perform operations of:
determining a moving direction of a vehicle as a forward direction or a reversed direction;
when the moving direction of the vehicle is the forward direction, determining the wheel to be the left wheel in response to the centrifugal acceleration of the wheel lagging behind the tangential acceleration of the wheel, and determining the wheel to be the right wheel in response to the centrifugal acceleration of the wheel overrunning the tangential acceleration of the wheel; and
when the moving direction of the vehicle is the reversed direction, determining the wheel to be the right wheel in response to the centrifugal acceleration of the wheel lagging behind the tangential acceleration of the wheel, and determining the wheel to be the left wheel in response to the centrifugal acceleration of the wheel overrunning the tangential acceleration of the wheel.

9. The wheel pressure monitoring chip according to claim 7, wherein the predetermined number of revolutions is greater than or equal to a half revolution and is less than or equal to one revolution.

10. The wheel pressure monitoring chip according to claim 7, wherein while sampling centrifugal acceleration and tangential acceleration of the wheel within the time duration, the controller is further configured to perform operations of:
sampling the centrifugal acceleration and the tangential acceleration of the wheel at any time point within the time duration.

11. The wheel pressure monitoring chip according to claim 7, wherein while obtaining a time duration for a wheel to rotate for the predetermined number of revolutions after the wheel being detected as rotating, the controller is further configured to perform operations of:
obtaining an angular velocity of the wheel, after the wheel being detected as rotating; and
obtaining the time duration for the wheel to rotate for the predetermined number of revolutions based on the angular velocity of the wheel.

12. The wheel pressure monitoring chip according to claim 11, wherein while obtaining an angular velocity of the wheel, after the wheel being detected as rotating, the controller is further configured to perform operations of:
obtaining the centrifugal acceleration of the wheel, and determining whether the centrifugal acceleration of the wheel is greater than a predetermined threshold; and
obtaining the angular velocity of the wheel based on the centrifugal acceleration of the wheel in response to the centrifugal acceleration of the wheel being greater than a predetermined threshold.

* * * * *